US008578294B2

(12) United States Patent
Eom et al.

(10) Patent No.: US 8,578,294 B2
(45) Date of Patent: Nov. 5, 2013

(54) MENU USER INTERFACE PROVIDING DEVICE AND METHOD THEREOF

(75) Inventors: Young Ik Eom, Gyeonggi-do (KR); Kwang Sun Ko, Seoul (KR); Hyunsu Jang, Gyeonggi-do (KR); Hyunjin Cho, Seoul (KR); Yongwoo Jung, Seoul (KR); Hyunwoo Choi, Gyeonggi-do (KR); Gyehyeon Gyeong, Gyeonggi-do (KR); Jung Hwan Choi, Seoul (KR); Zhao Zhen, Gyeonggi-do (KR); Taehyoung Kim, Gyeonggi-do (KR); Younwoo Kim, Gyeonggi-do (KR)

(73) Assignee: Sungkyunkwan University Foundation For Corporate Collaboration, Gyeonggi-Do (KR)

( * ) Notice: Subject to any disclaimer, the term of this patent is extended or adjusted under 35 U.S.C. 154(b) by 983 days.

(21) Appl. No.: 12/040,405

(22) Filed: Feb. 29, 2008

(65) Prior Publication Data

US 2009/0183100 A1 Jul. 16, 2009

(30) Foreign Application Priority Data

Jan. 11, 2008 (KR) ........................ 10-2008-0003630

(51) Int. Cl.
*G06F 3/048* (2013.01)
(52) U.S. Cl.
USPC ........... 715/834; 715/769; 715/810; 715/814; 715/817; 715/821; 715/822; 715/823; 715/824; 715/828
(58) Field of Classification Search
USPC ................................................ 715/769, 834
See application file for complete search history.

(56) References Cited

U.S. PATENT DOCUMENTS

| 6,448,987 | B1* | 9/2002 | Easty et al. ................... 715/834 |
| 7,898,529 | B2* | 3/2011 | Fitzmaurice et al. ......... 345/173 |
| 2005/0168449 | A1* | 8/2005 | Katayose ...................... 345/173 |
| 2005/0278647 | A1* | 12/2005 | Leavitt et al. ................. 715/765 |
| 2006/0026535 | A1* | 2/2006 | Hotelling et al. ............. 715/863 |
| 2007/0220444 | A1* | 9/2007 | Sunday et al. ................ 715/788 |
| 2008/0165136 | A1* | 7/2008 | Christie et al. ................ 345/173 |
| 2009/0085911 | A1* | 4/2009 | Fitzmaurice et al. ......... 345/419 |

FOREIGN PATENT DOCUMENTS

KR 2007-0037546 4/2007

OTHER PUBLICATIONS

Office Action dated Oct. 13, 2009 for Korean Patent Application 10-2008-0003630.

* cited by examiner

*Primary Examiner* — Doon Chow
*Assistant Examiner* — Anil N Kumar
(74) *Attorney, Agent, or Firm* — James P. Muraff; Neal, Gerber & Eisenberg LLP (57) ABSTRACT

A menu user interface providing device and a method thereof are disclosed. In accordance with an embodiment of the present invention, the method of providing a menu user interface by a portable apparatus, including determining whether a main menu icon displayed on a touch screen is selected; determining whether a menu mode is an activation mode or an inactivation mode if the main menu icon is selected; and changing the menu mode into the activation mode if the menu mode is determined as the inactivation mode and forming an expanded menu by radically arranging a submenu of n hierarchies, n being a natural number, corresponding to the main menu icon and displaying the formed expanded menu through a touch screen. Accordingly, with the present invention, a user interface capable of inputting various data with easy manipulation and minimized multi-points can be provided.

5 Claims, 9 Drawing Sheets

MENU USER INTERFACE PROVIDING DEVICE AND METHOD THEREOF

CROSS-REFERENCE TO RELATED PATENT APPLICATIONS

This application claims the benefit of Korean Patent Application No. 10-2008-0003630, filed on Jan. 11, 2008, in the Korean Intellectual Property Office, the disclosure of which is incorporated herein in its entirety by reference.

BACKGROUND OF THE INVENTION

1. Field of the Invention

The present invention relates to a portable apparatus, more specifically to a user interface providing device and a method thereof in a portable apparatus having a touch screen.

2. Background Art

The prompt development of information communication technologies and the acquirement of infrastructure have led to various small size types of computing devices. The developed electronic technologies with great delicacy make it possible for the electronic device, the size of which is small enough to be placed on the palm of the hand, to have the better performance than the conventional super computer. Now, the electronic device can access Internet without constraints of time and space through the developed technologies of wireless Internet and the diffusion of network infrastructure.

Accordingly, a user can use a variety of portable apparatuses such as MP3, PDA, smart phones, UMPC and PMP. However, adding high performance and various functions to the portable apparatuses has resulted in more complex user interface for controlling the pertinent functions. Further, the restriction of the hardware user interface due to the small size and mobility makes it difficult for users to use the apparatuses.

Particularly, the development of the wireless Internet technologies requires portable apparatuses to perform complex functions such as using e-mail and looking into or changing files. However, since the typical input interface device such as keyboards and mouses are too big and heavy to be applied to the mobile communication apparatuses.

Accordingly, this has aroused increasingly interests in touch screens and has allowed the mobile communication apparatuses having touch screens to be provided. However, the touch screens have less accurate pointing and no right-click as compared with mouses. Further, the current touch screens provided through the mobile communication apparatuses have no suitable graphic user interfaces (GUI).

SUMMARY OF THE INVENTION

The present invention provides a user interface providing device and a method thereof that can provide a user interface capable of inputting various data with easy manipulation and the minimized number of input points.

The present invention also provides a user interface providing device and a method thereof that can quickly search a menu to overcome the inaccurate pointing of a touch screen.

The present invention also provides a user interface providing device and a method thereof that can provide a suitable graphic user interface (GUI) for a touch screen equipped in a portable apparatus.

An aspect of the present invention features a method of providing a menu user interface by a portable apparatus having a touch screen.

According to an embediment of the present invention, the method of providing a menu user interface by the portable apparatus can include determining whether a main menu icon displayed on a touch screen is selected; determining whether a menu mode is an activation mode or an inactivation mode if the main menu icon is selected; and changing the menu mode into the activation mode if the menu mode is determined as the inactivation mode and forming an expanded menu by radially arranging submenus of n hierarchies, n being a natural number, corresponding to the main menu icon and outputting the formed expanded menu through a touch screen.

The method can further include changing the menu mode into the inactivation mode if the menu mode is determined as the activation mode and displaying the main menu icon through the touch screen by unexpanding the expanded menu.

The step of forming the expanded menu can include arranging the main menu icon at a position; and arranging the submenus of the n hierarchies radially about the main menu icon outside the main menu icon.

The method can further include determining whether a submenu icon of submenus of the n hierarchies is selected or dragged; and performing a function or a command predetermined corresponding to the submenu icon if it is determined that the submenu icon is selected.

The step of determining whether the submenu icon of submenus of the n hierarchies is selected or dragged can include receiving touch position information and touch-released position information from the touch screen and determining that the submenu icon is dragged if a difference between the touch position information and the touch-released position information that are inputted within a predetermined period of time is the same as or larger than a predetermined threshold; and determining that the submenu icon is selected if the difference between the touch position information and the touch-released position information that are inputted within the predetermined period of time is smaller than the predetermined threshold.

The method can further include generating rotation information per each hierarchy by using predetermined position information of the main menu icon and the inputted touch-released position information if it is determined that the submenu icon is dragged; and moving and arranging positions of submenu icons of a hierarchy included in the dragged submenu icon and a lower hierarchy by using the generated rotation information per hierarchy.

The rotation information can include at least one of moving direction information and moving distance information.

The step of generating rotation information per each hierarchy by using predetermined position information of the main menu icon and the inputted touch-released position information can include, in the case of a menu hierarchy including the dragged menu icon, generating rotation information of the menu hierarchy by using the touch position information and the touch-released position information The step of generating rotation information per each hierarchy by using the predetermined position information of the main menu icon and the inputted touch-released position information can include, in the case of a submenu hierarchy that is directly subordinate to the dragged menu icon, generating rotation fiducial line by using the predetermined position information of the main menu icon and the touch-released position information; and generating rotation information of the submenu hierarchy to allow a first submenu icon of the submenu hierarchy to be place on the rotation fiducial line.

Another aspect of the present invention features a portable apparatus capable of providing an expanded menu interface.

According to an embodiment of the present invention, the portable apparatus can include a touch screen; a processing unit, analyzing a menu mode if a main menu icon displayed through a touch screen is selected, changing the menu mode into an activation mode if the menu mode is an inactivation mode and generating and outputting a menu activating command; and an UI forming unit, forming an expanded menu by radially arranging submenus of n hierarchies, n being a natural number, corresponding to the main menu icon according to the menu activating command, whereas the expanded menu is displayed through the touch screen.

If the menu mode is the activation mode, the processing unit can change the menu mode into the inactivation mode and generate and output a menu inactivating command, and the UI forming unit can form a basic menu in which the main menu icon is arranged according to the inactivating command and display the formed basic menu through the touch screen.

The UI forming unit can arrange the main menu icon at a position and form the expanded menu by radially arranging the submenu icons of the n menu hierarchies about the arranged main menu icon outside the main menu icon.

The processing unit can determine whether a menu icon is selected or dragged by using position information inputted through the touch screen and, if it is determined that the menu icon is selected, control to perform a function or a command predetermined corresponding to the selected menu icon.

The position information can include touch position information related to a position touched on the touch screen and touch-released position information related to a position in which a touch is released.

The processing unit can determine that the menu icon is selected, if a difference between the touch position information and the touch-released position information that are inputted within a predetermined period of time is smaller than a predetermined threshold, and determine that the menu icon is dragged, if the difference is the same as or larger than the predetermined threshold.

If it is determined that the menu icon is dragged, the processing unit can generate a rotation command including the inputted position information and output the generated rotation command to the UI forming unit, and the UI forming unit can generate rotation information per menu hierarchy by using predetermined position information of the main menu icon and the inputted position information, rotate the menu icons of each menu hierarchy according to the generated position information per menu hierarchy and display the rotated menu icons through the touch screen.

The rotation information per menu hierarchy can include rotation direction information and moving distance information.

The UI forming unit can generate rotation information of a menu hierarchy including the dragged menu icon by using the touch position information and the touch-released position information and move and arrange menu icons included in the menu hierarchy.

The UI forming unit can generate rotation fiducial line by using the predetermined position information of, the main menu icon and the touch-released position information and move and arrange submenu icons included in the submenu hierarchy to allow a first submenu icon of a sub menu that is directly subordinate to the dragged menu icon to be placed on the rotation fiducial line.

BRIEF DESCRIPTION OF THE DRAWINGS

These and other features, aspects and advantages of the present invention will become better understood with regard to the following description, appended Claims and accompanying drawings where:

DESCRIPTION OF THE EMBODIMENTS

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, some embodiments of the present invention will be described in detail with reference to the accompanying drawings.

Figure 1:
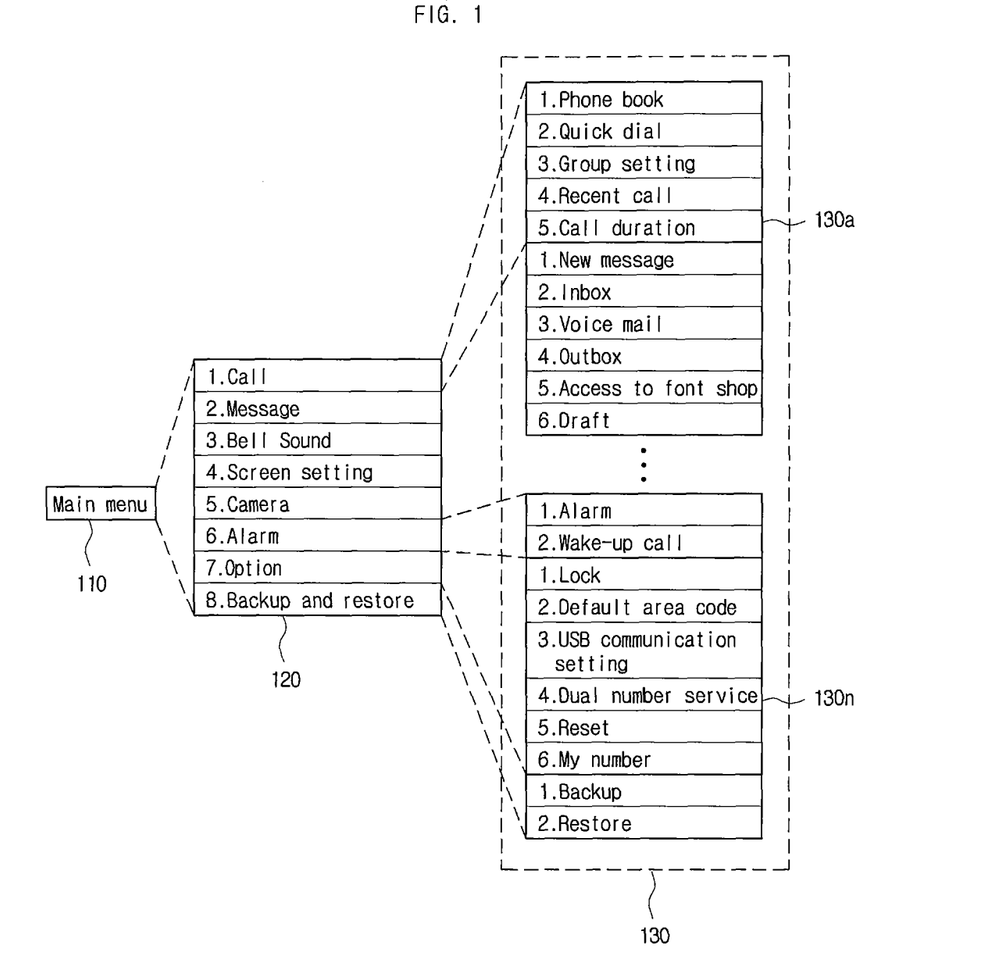
FIG. 1 illustrates a menu user interface provided to the conventional portable apparatus.

FIG. 1 illustrates a menu user interface provided to the conventional portable apparatus.

As illustrated in FIG. 1, according to the conventional menu displaying method, if pointing means hierarchically accesses lower menus through a main menu, the items of a corresponding submenu can be successively displayed. In particular, if a user selects a main menu 110, at least one submenu 120 subordinate to the main menu 110 can be displayed. Also, if the user selects any one menu item of the displayed submenus 120, at least one lower submenu subordinate to the selected menu item can be displayed.

For example, if the menu item "alarm wake-up call" is assumed to be selected in FIG. 1, the lower submenus (i.e. a menu item "alarm" and a menu item "wake-up call") subordinate to the menu item "alarm" can be displayed. As such, if a menu item of an upper hierarchy is selected according to the conventional menu interface providing method, which is the top-down method, since the submenus subordinate to the selected menu item are successively displayed, the user can be required to access from the top menu item successively in order to select the menu item at the last position.

Figure 2:
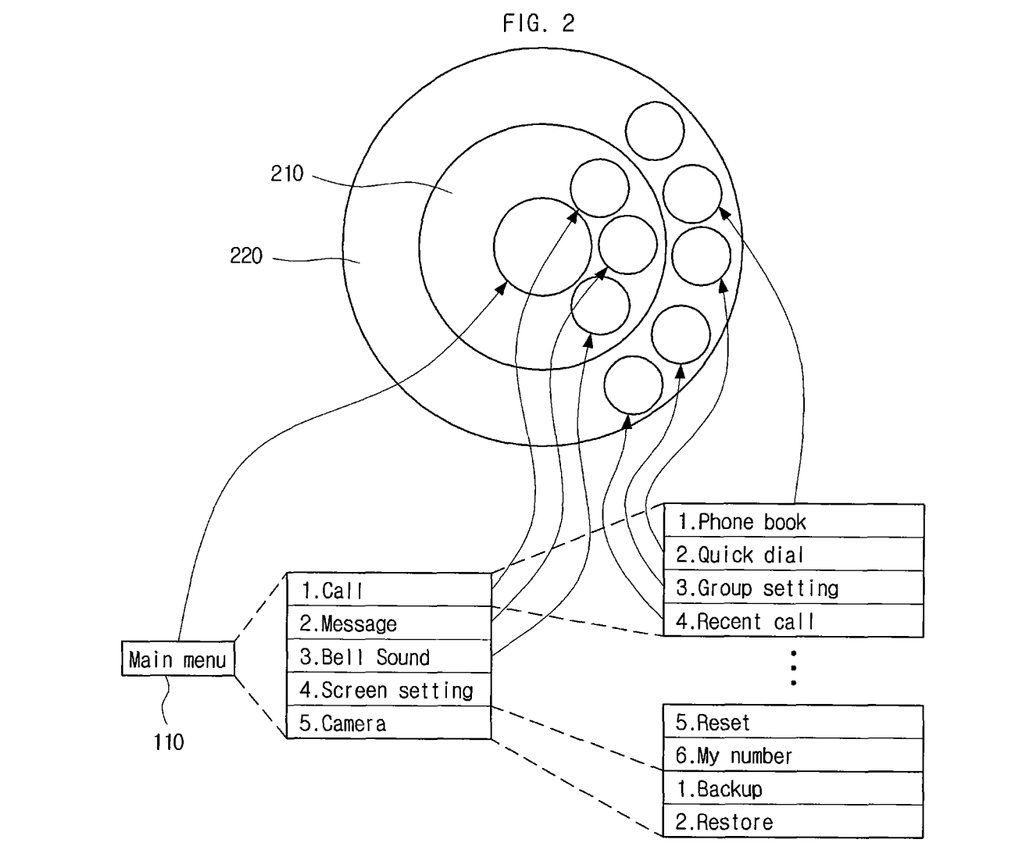
FIG. 2 illustrates a menu user interface provided to a portable apparatus in accordance with an embodiment of the present invention.

FIG. 2 illustrates a menu user interface provided to a portable apparatus in accordance with an embodiment of the present invention. The menu user interface illustrated in FIG. 2 is merely an example showing the conventional menus radially arranged in a form of concentric circles, which are displayed through a touch screen 315. Alternatively, it is natural that the menus arranged in a form of polygons instead of the concentric circles can be displayed.

As shown in FIG. 2, according to the menu user interface providing method in accordance with the present invention, all submenus of lower menu hierarchies subordinate to the main menu based on the main menu can be radially arranged.

In other words, the main menu icon can be located at the center, and the submenus subordinate to the main menu icon (hereinafter, referred to as a "mid-menu group" for the convenience of the understanding and description) can be radially located at the outside. Also, the submenus subordinate to the mid-menu group (hereinafter, referred to as a "lower menu group" for the convenience of the understanding and description) can be radially located outside of the mid-menu group.

Even though the description assumes that the menu is divided into 3 groups, which are the main menu, the mid-menu group and the lower menu group, it is natural that the menu can be divided into n groups, n being a natural number, according to the subordinated lower menu group.

Hereinafter, a section in which the mid-menu group subordinate to the main menu is located is referred to as a mid-menu hierarchy for the convenience of understanding and description. A section in which the lower-menu group is located is also referred to as a lower menu hierarchy.

In other words, as illustrated in FIG. 2, the main menu icon can be located at the center, and the mid-menu icons directly subordinate to the main menu icon can be located at the mid-menu hierarchy 210. The lower menu icons which are subordinate to the mid-menu icons can be located at the lower menu hierarchy 220.

The menu user interface in accordance with the present invention will be more clearly understood by the following description.

Figure 3:
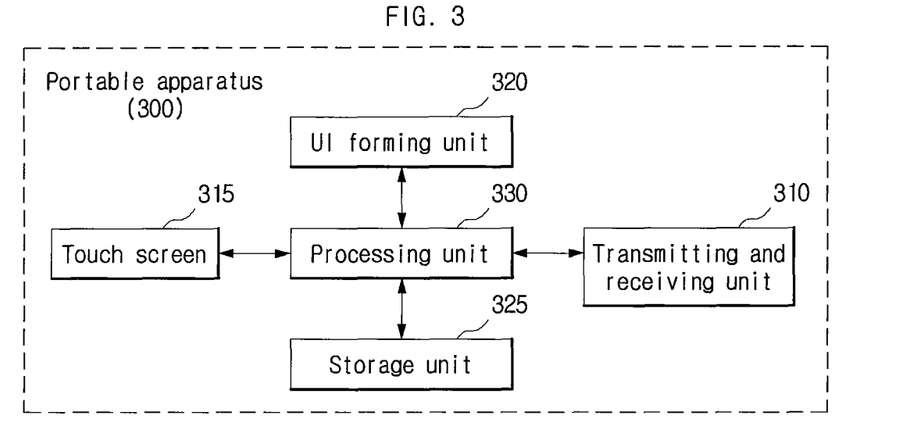
FIG. 3 is a block diagram illustrating each internal element of a portable apparatus providing a menu user interface in accordance with an embodiment of the present invention.

FIG. 3 is a block diagram illustrating each internal element of a portable apparatus providing a menu user interface in accordance with an embodiment of the present invention.

As illustrated in FIG. 3, the portable apparatus 300 in accordance with the present invention can be configured to include a transmitting and receiving unit 310, a touch screen 315, an UI forming unit 320, a storage unit 325 and a processing unit 330.

The transmitting and receiving unit 310 can transmit and receive data to and from an information providing server (not shown) providing a service and other devices (e.g. the opposite party's device), connected through a communication network.

Here, the communication network can include a base transceiver station (BTS), a base station controller (BSC), a switcher and a home location register (HLR). The base transceiver station can perform the wireless access function to the portable apparatus 300 and the wire or wireless access function to the portable and the base station controller.

The switcher can provide a line switching service to a mobile communication subscriber by being linked with a line network. The home location register can store device information, subscribing information and position information of the mobile communication subscriber to perform the authentication of the subscriber required through the switcher.

If the communication network is a wideband code division multiple access (WCDMA) network, the portable apparatus 300 can perform the access through a node-B, an UMTS terrestrial radio access network (UTRAN), a serving GPRS support node (SGSN) and a gateway GPRS support node (GGSN).

The SGSN, which is a node to exchange data packet with the portable apparatus 300 in the WCDMA network, can perform packet routing and transmission, mobility management, logic link management, authentication and charging. The GGSN, which is a node to perform the access function between a general packet radio service (GPRS) backbone network and an external packet data network, can convert a GPRS packet transmitted from the SGSN to a suitable packet data protocol (PDP) format packet (e.g. IP and X.25) to transmit the converted packet and convert a PDP address of the transmitted packet data to a global system for mobile communications (GSM) address of a receiver. Also, the GGSN can perform the authentication function and the charging function by storing an SGSN address and a profile of the subscriber that are located in a location register of the SGSN.

The touch screen 315 can include a screen (i.e. a display unit) and a touch panel. In the touch screen 315, if a user touches a menu icon displayed on the screen (i.e. the display unit), the touch panel can recognize the position corresponding to the touched menu icon and generate position information to output the generated position information to the processing unit 330. Here, the position information can include touch position information and touch-released position information.

The below description assumes that the touch screen 315 generates touch position information related to the position touched by a user and outputs the generated position information. However, it is natural that the touch screen 315 can recognize which menu is selected according to the position touched by a user and generate and output a corresponding input command.

The UI forming unit 320 can form a menu user interface according to the predetermined method by the control of the processing unit 330 and display the formed menu user interface on the touch screen 315. Alternatively, the UI forming unit 320 can store or output to the processing unit 330 the formed menu user interface or information according to the converted menu user interface (e.g. position information of each menu icon).

Figure 5:
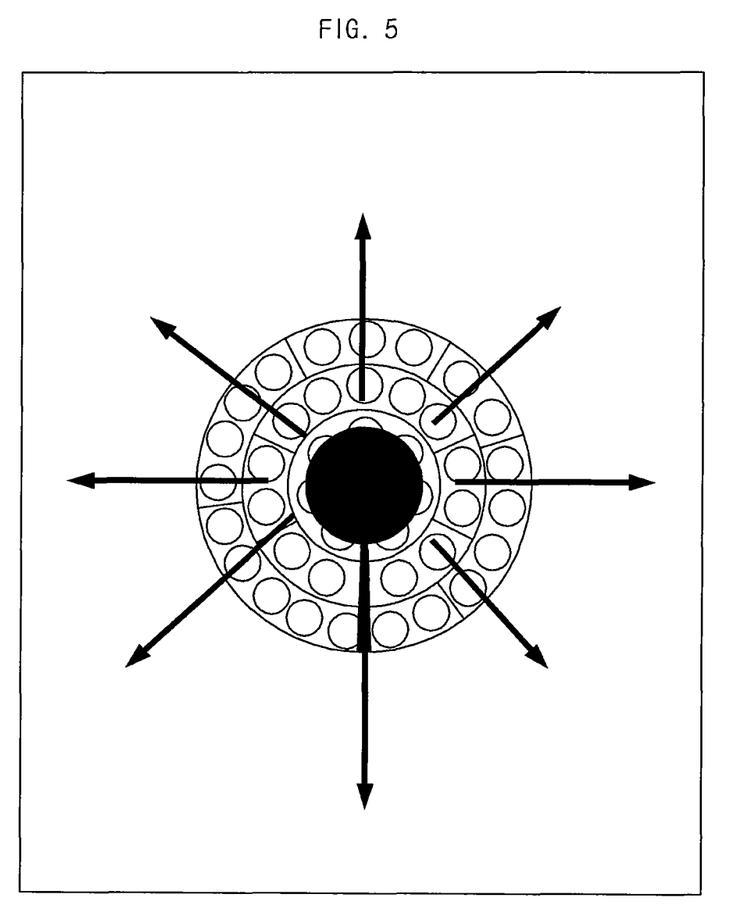
FIG. 5 illustrates how the menu is expanded through a touch screen in accordance with an embodiment of the present invention.

Hereinafter, an "expanded menu" is defined as the menu which is formed to include all submenus of the hierarchies subordinate to the main menu by the UI forming unit 320 according to the control command of the processing unit 330. For example, the expanded menu, as illustrated in FIG. 5, can be the menu including all submenus of the menu hierarchies.

Also, a "basic menu" is defined as the menu which is formed to include the main menu by the UI forming unit 320 according to the control command of the processing unit 330. For example, the basic menu, as illustrated in FIG. 3, can be the same menu as the main menu icon displayed through the touch screen 315.

For example, if a power is supplied to the portable apparatus 300, the UI forming unit 320 can display the basic menu through the touch screen 315 according to the control of the processing unit 330.

The UI forming unit 320 can also form the expanded menu to allow all submenus of the menu hierarchies to be radially arranged base on the main menu icon according to the control of the processing unit 330 in order to display the expanded menu through the touch screen 315. The method of allowing the UI forming unit 320 to form the expanded menu will be described below in detail with reference to FIG. 5.

Further, if a user drags a menu icon while the expanded menu is displayed by the control of the processing unit 330, the UI forming unit 320 can rotate the menus of the menu hierarchies including the dragged menu icon and the menus of the lower menu hierarchies subordinate to the pertinent menu hierarchy. The method of allowing the UI forming unit 320 to rotate menus will be described below in more detailed with reference to the related drawings.

Returning to FIG. 3, the storage unit 325 can store an application, each menu icon and information related to the position in which each menu icon is arranged, for operating the portable apparatus in accordance with the present invention.

The processing unit 330 can control each internal element (e.g. the transmitting and receiving unit 310, the touch screen 315, the UI forming unit 320 and the storage unit 325).

The processing unit 330 can also control to analyze position information inputted through the touch screen 315 and determine whether the submenu icon corresponding to the inputted information is selected (i.e. clicked) or dragged in order to perform a corresponding function. Here, the inputted position information can include touch position information and touch-released position information. Accordingly, the processing unit 330 can compute a difference value between the touch position information and the touch release position information, which are inputted within a predetermined period of time. If the computed value is smaller than a predetermined threshold value, the processing unit 330 can determine that the submenu icon is selected. However, if the computed value is the same as or larger than the threshold value the processing unit 330 can recognize that the submenu icon is dragged.

Figure 4:
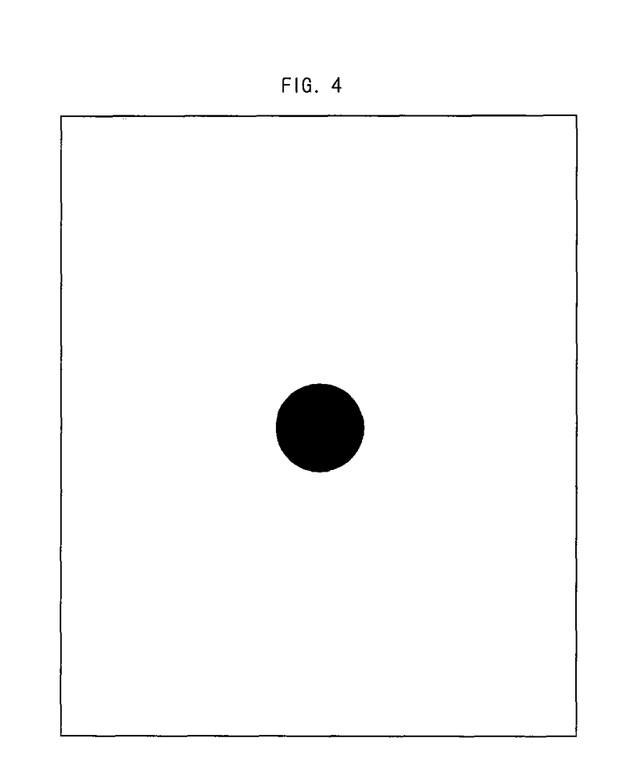
FIG. 4 illustrates how a basic menu is displayed through a touch screen in accordance with an embodiment of the present invention.

FIG. 4 illustrates how a basic menu is displayed through a touch screen in accordance with an embodiment of the present invention, and FIG. 5 illustrates how the menu is expanded through a touch screen in accordance with an embodiment of the present invention. The method of allowing the UI forming unit 320 to form the expanded menu will described with reference to FIG. 4 and FIG. 5.

If a power is supplied to the portable apparatus 300, the portable apparatus 300 can display a basic menu, as illustrated in FIG. 4, through the touch screen 315.

For example, the UI forming unit 320 can form the basic menu to allow a main menu icon to be displayed on the center of the touch screen 315, as illustrated in FIG. 4. Here, it is natural that the UI forming unit 320 can store information related to the position in which the main menu icon is displayed. In the state where which the main menu icon is displayed, if a user selects the displayed main menu icon (more particularly, a user touches the position corresponding to the pertinent main menu icon), the touch screen 315 can generate position information and output the generated position information to the processing unit 330. The processing unit 330 can recognize that the main menu icon is selected (i.e. touched) by a user by comparing the position information inputted from the touch screen 315 with the previously stored position information.

In other words, if a menu activating command is inputted from the processing unit 330, the UI forming unit 320 can form the submenu icons of n hierarchies corresponding to the main menu icon which are radially arranged based on the main menu icon and output the formed submenu icons through the touched screen 315. Here, n is a natural number. If a menu inactivating commend is inputted from the processing unit 330, the UI forming unit 320 can display main menu icon through the touch screen 315 in order to allow the submenu icons of the n hierarchies outputted through the touch screen 315 not to be displayed (i.e. in order to allow the main menu icon to be arranged as illustrated in FIG. 4).

FIG. 5 illustrates the submenu icons of the n hierarchies, which is activated by the UI forming 320 according to the menu activating command of the processing unit 330, displayed through the touch screen 315. Again, if the menu inactivating command is inputted from the processing unit 330, the UI forming unit 320 can display the main menu icon through the touch screen 315 as illustrated in FIG. 4 in the state where the menu icons are displayed through the touch screen 315 as illustrated in FIG. 5.

Although the description with reference to FIG. 5 assumes each menu icon arranged in a form of concentric circles is displayed through the touch screen 315, it is natural that each menu icon arranged in a form of polygons can be also displayed through the touch screen 315. In other words, the menu icons in accordance with the present invention are displayed by allowing each submenu icon to be expanded according to the activation of the main menu icon. This can be identically applied to all cases that the expanded submenu icons are unexpanded according to the inactivation of the main menu icon.

Figure 6:
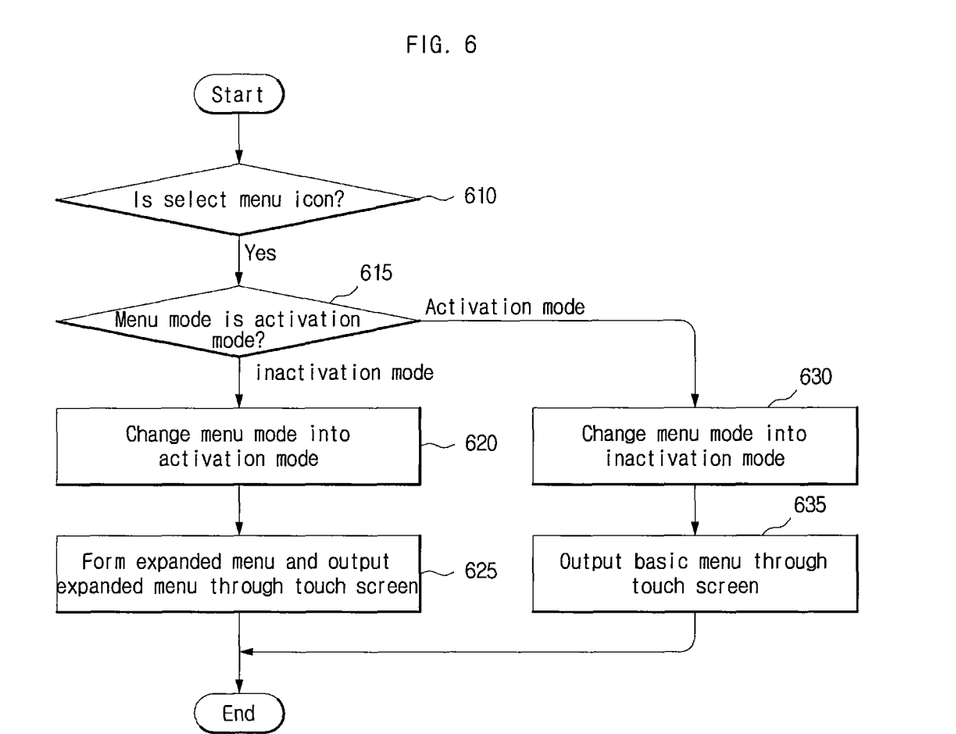
FIG. 6 is a flow chart illustrating the method of providing a menu user interface by a portable apparatus in accordance with an embodiment of the present invention.

FIG. 6 is a flow chart illustrating the method of providing a menu user interface by a portable apparatus in accordance with an embodiment of the present invention. Even though each step to be described below is performed by the internal elements of the portable apparatus 300, the below description refers to the elements collectively as the portable apparatus 300 for the convenience of understanding and description. The below description also assumes that the portable apparatus 300 are equipped with a touch screen. Further, the below description assumes that a main menu icon is displayed on the touch screen 315 of the portable apparatus 300. The next operations will be described.

In a step represented by 610, the portable apparatus 300 can determine whether the main menu icon is selected.

For example, while the main menu icon is displayed on the touch screen 315, if the main menu icon is selected (more particularly, the position corresponding to the main menu icon is touched) by a user, the touch screen 315 can output information related to the position corresponding to the main menu icon to the processing unit 330. Accordingly, the processing unit 330 can recognize that the main menu icon is selected.

If the main menu icon is not selected, the step represented by 610 is on standby.

However, if the main menu icon is selected, in the step represented by 615, the portable apparatus 300 can determine whether a menu mode is an activation mode or an inactivation mode.

For example, if a power is firstly supplied to the portable apparatus 300 and the main menu icon is displayed through the touch screen 315, the menu mode can be set as the inactivation mode. In other words, the default mode can be the inactivation mode. In this state, if a user selects the main menu icon, the menu mode can be changed into the activation mode by the control of the processing unit 330. Also, in the state where the menu mode is the activation mode, if the user selects the main menu icon again, the menu mode can return to the inactivation mode.

If the menu mode is the inactivation mode, in a step represented by 620, the portable apparatus 300 can change the menu mode into the activation mode.

In a step represented by 625, the portable apparatus 300 can form an expanded menu by allowing the submenu icons of the n hierarchies corresponding to the main menu icon to be radially displayed and display the formed expanded menu through the touch screen 315.

In more particular, as illustrated in FIG. 5, the portable apparatus 300 can place the main menu icon at the center. Also, the portable apparatus 300 can form the expanded menu by allowing the submenu icons of the n hierarchies corresponding to the main menu icon to be radially arranged outside the main menu icon. In other words, lower menus subordinate to the lower hierarchy can be located more distantly as illustrated in FIG. 5.

Hereinafter, the method of clicking or dragging a menu icon will be described in more detail with reference to FIG. 7.

Returning to the step represented by 615, if the menu mode is the activation mode, in a step represented by 630, the portable apparatus 300 can change the menu mode into the inactivation mode.

In a step represented by 635, the portable apparatus 300 can display a basic menu through the touch screen 315. In other words, the portable apparatus 300 can display the main menu (more particularly, the main menu icon) through the touch screen 315 (refer to FIG. 4).

Figure 7:
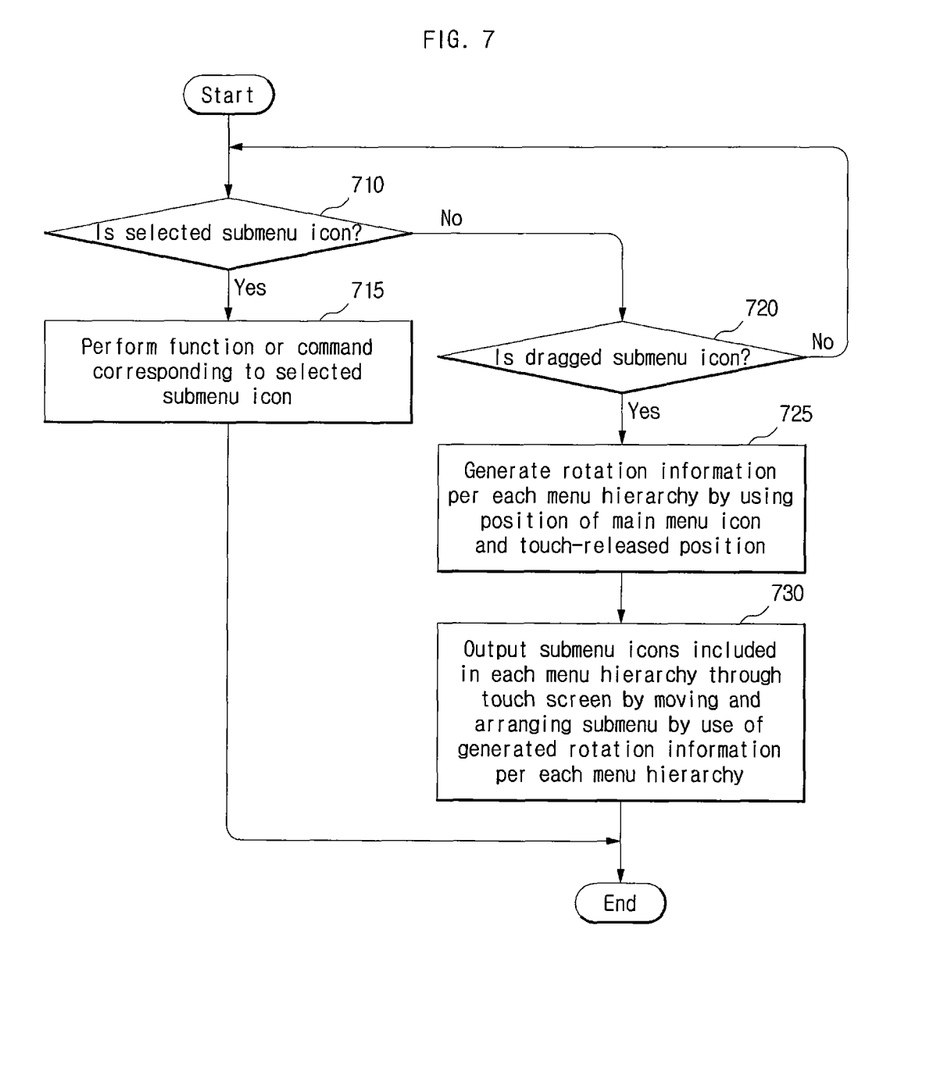
FIG. 7 is a flow chart illustrating the method of rotating a submenu in accordance with an embodiment of the present invention.
Figure 8:
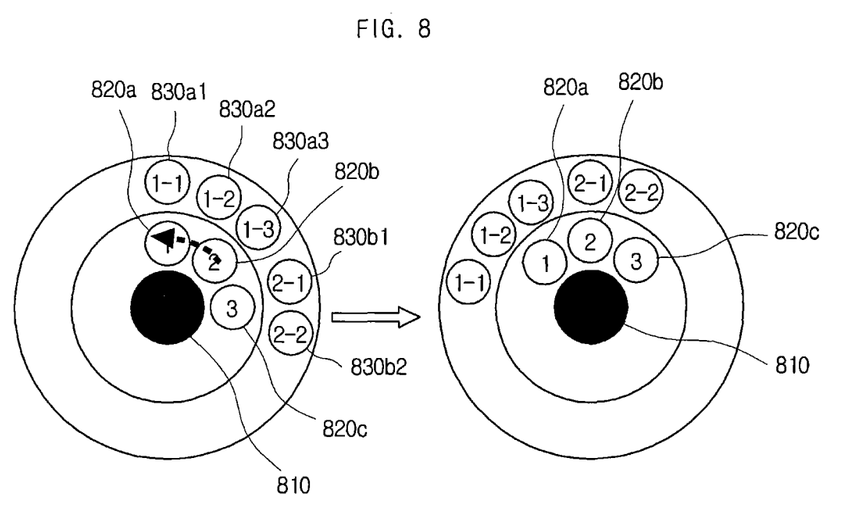
FIG. 8 and FIG. 9 illustrate example of the rotation of a menu user interface in accordance with an embodiment of the present invention.
Figure 9:
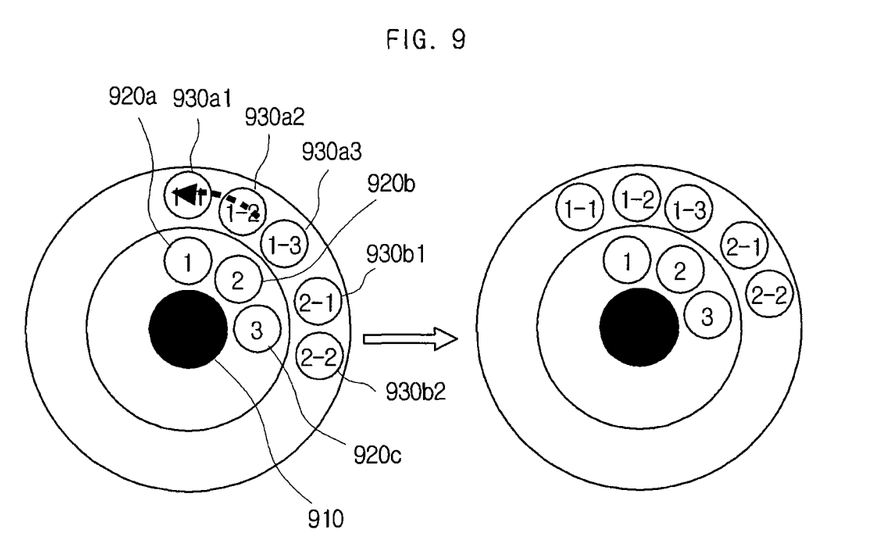

FIG. 7 is a flow chart illustrating the method of rotating a submenu in accordance with an embodiment of the present invention, and FIG. 8 and FIG. 9 illustrate example of the rotation of a menu user interface in accordance with an embodiment of the present invention. The below description assumes that an expanded menu has been displayed through the touch screen 315. Even though each step to be described below is performed by the internal elements of the portable apparatus 300, the below description refers to the elements collectively as the portable apparatus 300 for the convenience of understanding and description.

In a step represented by 710, the portable apparatus 300 can determine whether a submenu icon of the displayed expanded menu is clicked (i.e. selected) by a user.

For example, the portable apparatus 300 can pre-store information related to the position of each submenu icon according to the expanded menu displayed through the touch screen 315. Accordingly, if a user selects (i.e. clicks) a submenu icon, the touch screen 315 can output the corresponding position information to the processing unit 330. As a result, the processing unit 330 can recognize which submenu icon is selected (or clicked) by using information related to the previously stored expanded menu and the position information inputted through the touch screen 315.

If it is determined that the submenu icon is selected (or clicked), in a step represented by 715, the portable apparatus 300 can perform the function or command corresponding to the selected submenu icon.

As described above, since the information related to the expanded menu is previously stored, if information related to the position touched by a user through the touch screen 315, the portable apparatus 300 can recognize which submenu icon is selected (or clicked) by using the pertinent position information. Accordingly, the portable apparatus 300 can perform the function or/and command pre-determined according to the recognized submenu icon.

However, if the submenu icon is not selected, in a step represented by 720, the portable apparatus 300 can determine whether the user drags the submenu icon.

For example, if the first position touched by the user is different from the position in which the touch is released, the portable apparatus 300 can recognize that the user drags the submenu icon.

For example, as illustrated in FIG. 8, it is assumed that a user touches a first submenu icon and then moves to the position corresponding to a second submenu icon and releases the touch. In this case, if the difference between the first position touched by the user and the position in which the touch is released is the same as or large than a predetermined threshold, the portable apparatus 300 can recognize that the first submenu icon is dragged toward the position of the second submenu icon.

If the submenu icon is not dragged, the process returns to the step represented by 710.

However, if it is determined that the submenu icon is dragged, in a step represented by 725, the portable apparatus 300 can generate rotation information per each menu hierarchy by using the position of the main menu icon and the touch-released position. Here, the rotation information can be any one of rotation direction information and movement position information.

For example, the portable apparatus 300 can generate a virtual rotation fiducial line by using the position of the main menu icon and the touch-released position. Then, the portable apparatus 300 can generate each rotation information of the menu hierarchy, including the dragged submenu icon and its lower menu hierarchies.

As illustrated in FIG. 4 and FIG. 8, it can be recognized that the submenu icons in the same hierarchy are located within a certain distance about the main menu icon and as the lower submenu is lower, the lower submenu is located more distantly from the main menu icon. Accordingly, it can be also recognized that each menu hierarchy has the different rotation radius.

For example, this will be described with reference to FIG. 8. As illustrated in FIG. 8, it is assumed that a second submenu icon of a first menu hierarchy is dragged toward the position of a first submenu icon of the first menu hierarchy. The portable apparatus 300 can generate a virtual rotation fiducial line by using the position of the main menu icon and the position in which the second submenu icon of the first menu hierarchy is dragged (i.e. the position the first menu hierarchy of the first submenu icon). The portable apparatus 300 can also generate first menu hierarchy rotation information by using the position of the submenu icon (i.e. the first submenu icon) placed on the virtual rotation fiducial line in the first menu hierarchy and the position of the submenu icon (i.e. the second submenu icon) to be desired to be dragged. Further, the portable apparatus 300 can move the position of each submenu icon included in the first menu hierarchy by using the generated first menu hierarchy rotation information.

The portable apparatus 300 can generate second menu hierarchy rotation information by using the position of a first lower submenu icon among the lower submenus directly subordinate to the submenu icon (i.e. the second submenu icon of the first menu hierarchy) moved from the first menu hierarchy to the virtual rotation fiducial line and the position of the lower submenu icon (referring to 820a1 of FIG. 8) placed on the virtual rotation fiducial line in the menu hierarchy including the first lower submenu icon (i.e. the second menu hierarchy). The portable apparatus 300 can also move the positions of the submenu icons included in the second menu hierarchy by using the generated second menu hierarchy rotation information. In other words, the portable apparatus 300 can move a first lower sub menu icon of the lower submenus directly subordinate to the dragged submenu icon along with the dragged submenu icon.

Of course, if there is a lower menu hierarchy of the second menu hierarchy, the portable apparatus 300 can move the position of the lower submenu icon directly subordinate to the submenu icon of the second menu hierarchy moved to the virtual rotation fiducial line by the same method in order to place move the position of the lower submenu icon on the virtual rotation fiducial line.

For another example, the portable apparatus 300 can move the submenu icons of each menu hierarchy by computing and using the rotation angle according to the dragged submenu icon.

For another example, as illustrated in FIG. 9, it is assumed that a user drags any one of the submenus of the lowest hierarchy. In particular, it is assumed that a user drags a second submenu icon 930$a2$ of the lowest menu hierarchy illustrated in FIG. 9 to a first submenu icon 930$a1$. The portable apparatus 300 can generate rotation information of the pertinent hierarchy by using touch position information and touch-released position information of the second submenu icon 930$a1$. The portable apparatus 300 can move and arrange all submenu icons 930$a1$ through 930$b2$ included in the pertinent menu hierarchy by using the rotation information. However, it can be recognized that the portable apparatus 300 does not move and arrange the menu icon included in the upper menu hierarchy of the dragged submenu icon.

In a step represented by 730, the portable apparatus 300 can display the submenu icons included in each menu hierarchy through the touch screen 315 by moving and arranging the submenu by use of the generated rotation information per each menu hierarchy. Here, the rotation information of each moved and arranged menu icon.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalent.

What is claimed is:

1. A method of providing a menu user interface on a portable apparatus, the method comprising:
   recognizing a first selection of a main menu icon displayed on a touch screen associated with the portable apparatus;
   determining that a first radial submenu associated with the main menu icon is not displayed on the touch screen;
   displaying the first radial submenu in response to the first selection of the main menu icon, wherein the first radial submenu is comprised of a plurality of first submenu icons positioned around the circumference of the main menu icon;
   simultaneously with displaying the first radial submenu, displaying a second radial submenu comprising a plurality of second submenu icons arranged around the circumference of the first radial submenu, each second submenu icon configured to trigger a distinct function associated with one of the plurality of first submenu icons;
   undisplaying the first radial submenu and the second radial submenu in response to a second selection of the main menu icon;
   generating a rotation fiducial line through a touched first submenu icon by using predetermined position information of the main menu icon and touch-released position information;
   generating rotation information of the second radial submenu to allow a second submenu icon configured to trigger a distinct function associated with the touched first submenu icon to be placed on the rotation fiducial line, wherein the second submenu icon is directly subordinate to the touched first submenu icon and the rotation information comprises at least one of moving direction information and moving distance information; and
   determining whether the touched first submenu icon from among the plurality of first submenu icons is selected or dragged, wherein the step of determining whether the touched first submenu icon is selected or dragged comprises:
   receiving touch position information and the touch-released position information from the touch screen and determining that the touched first submenu icon is dragged if a difference between the touch position information and the touch-released position information that are inputted within a predetermined period of time is the same as or larger than a predetermined threshold; and
   determining that the touched first submenu icon is selected if the difference between the touch position information and the touch-released position information that are inputted within the predetermined period of time is smaller than the predetermined threshold.

2. A portable apparatus, comprising:
   a touch screen;
   a processing unit configured to recognize a first selection of a main menu icon displayed through the touch screen and to generate and output a submenu activating command in response thereto; and
   an UI forming unit for simultaneously forming a first radial submenu and a second radial submenu in response to the submenu activating command by radially arranging a plurality of first submenu icons around the circumference of the main menu icon, and a plurality of second submenu icons around the circumference of the first radial submenu;
   wherein each second submenu icon is configured to trigger a distinct function associated with one of the plurality of first submenu icons;
   wherein the UI forming unit is further for:
   generating a rotation fiducial line through a touched first submenu icon by using predetermined position information of the main menu icon and touch-released position information; and
   generating rotation information of the second radial submenu to allow a second submenu icon configured to trigger a distinct function associated with the touched first submenu icon to be placed on the rotation fiducial line, wherein the second submenu icon is directly subordinate to the touched first submenu icon and the rotation information comprises at least one of moving direction information and moving distance information;
   wherein the processing unit is further configured to determine whether the touched first submenu icon from among the plurality of first submenu icons is selected or dragged by using position information inputted through the touch screen, wherein the position information comprises touch position information related to a position touched on the touch screen and the touch-released position information related to a position in which a touch is released; and wherein the processing unit is further configured to determine that the touched first submenu icon is selected if a difference between the touch position information and the touch-released position information that are inputted within a predetermined period of time is smaller than a predetermined threshold, and to determine that the touched first submenu icon is dragged if the difference is the same as or larger than the predetermined threshold.

3. The apparatus of claim 2, wherein if the processing unit determines that the touched first submenu icon is dragged, the processing unit generates a rotation command including the inputted position information and outputs the generated rotation command to the UI forming unit, and the UI forming unit rotates the plurality of first submenu icons according to the generated position information and displays the rotated first submenu icons through the touch screen.

4. The apparatus of claim 2, wherein the processing unit is further configured to recognize a second selection of the main menu icon displayed through the touch screen, and to generate and output a submenu inactivating command in response thereto.

5. The apparatus of claim 4, wherein the UI forming unit is further configured to form a menu comprising only the main menu icon in response to the submenu inactivating command.

* * * * *